W. E. SCHEIBNER.
FLUID CONTROLLED VARIABLE SPEED TRANSMISSION GEARING.
APPLICATION FILED SEPT. 13, 1913.
1,119,320.
Patented Dec. 1, 1914.
2 SHEETS—SHEET 1.
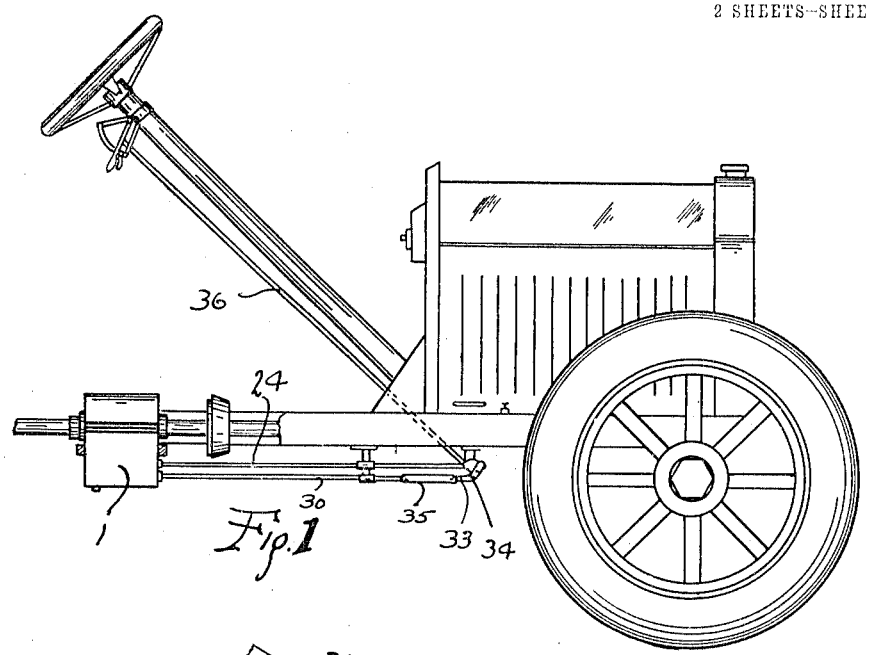
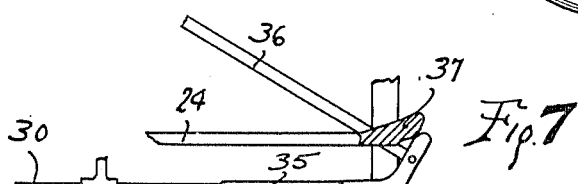
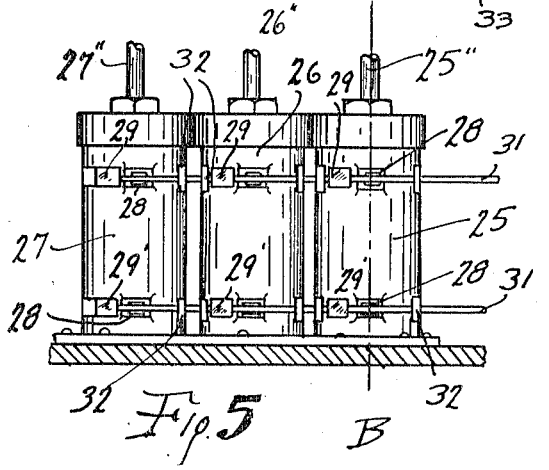
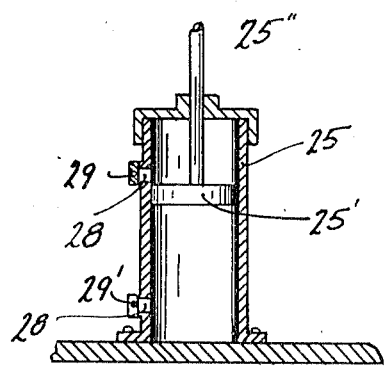
Inventor
Walter Earle Scheibner
Witnesses
Harold Scantlebury
Edna Broyles
By Herbert E. Smith
Attorney

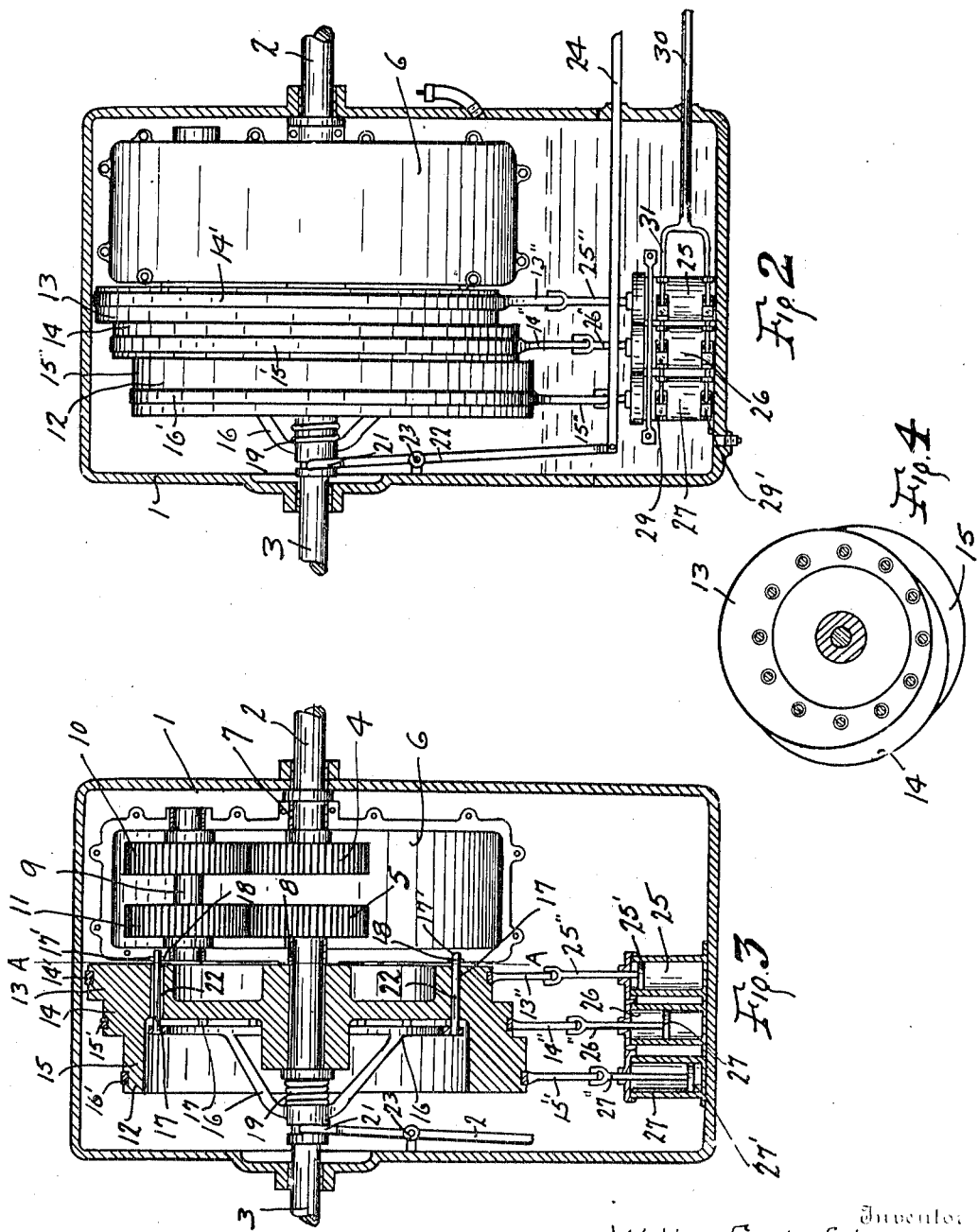

UNITED STATES PATENT OFFICE.

WALTER EARLE SCHEIBNER, OF WILBUR, WASHINGTON.

FLUID-CONTROLLED VARIABLE-SPEED-TRANSMISSION GEARING.

1,119,320. Specification of Letters Patent. Patented Dec. 1, 1914.

Application filed September 13, 1913. Serial No. 789,642.

*To all whom it may concern:*

Be it known that I, WALTER EARLE SCHEIBNER, a citizen of the United States, residing at Wilbur, in the county of Lincoln, State of Washington, have invented certain new and useful Improvements in Fluid-Controlled Variable-Speed-Transmission Gearing, of which the following is a specification.

My invention relates to variable speed transmission gearing of the fluid controlled type.

It provides a simple device of this character, which has an extremely flexible range of control without the use of friction surfaces and the attendant loss of power, wear and strain resulting therefrom.

Furthermore my invention provides a transmission device which is particularly adapted for use on automobiles because of its exceedingly simple construction, efficient and durable operation, flexibility and simplicity of control.

In the drawings annexed hereto and forming a part of this specification: Figure 1 illustrates a partial side elevation of an automobile embodying my invention. Fig. 2 is a side elevation view showing the outer casing in section on a vertical plane therethrough, so as to show the mechanism inclosed therein. Fig. 3 is a vertical sectional view, on a vertical plane, of my invention showing the details thereof. Fig. 4 is a section view on the line A—A Fig. 3 showing the relative position of the eccentrics. Fig. 5 is a side elevation of the fluid control cylinders. Fig. 6 is a section view on the line B—B Fig. 5 showing in detail the fluid control cylinders, pistons and valves. Fig. 7 shows the levers for simultaneously operating the clutch and valves.

Referring to the drawings: The embodiment of my invention shown herein consists of an exterior casing —1— having journaled therein a driving shaft —2— and a driven shaft —3—; the main object being to provide an intermediate gearing between the two shafts, whereby the speed of the driven shaft —3— may be varied at will regardless of the speed of the driving shaft —2—. With this and other objects in view I provide, on the end of shaft —2— which projects within the casing —1—, a gear —4— keyed thereto, and similarly I provide a gear —5— on the end of the shaft —3— and keyed thereto. Within the casing —1— and inclosed in the said gears —4— and —5— is mounted the casing —6— journaled at —7— and —8— on the shafts —2— and —3—, respectively, so that it may rotate thereon. Rotatably journaled in the casing —6— is a shaft —9— carrying the gears —10— and —11— keyed thereto and meshing with the gears —4— and —5—, respectively.

Mounted on the shaft —3— adjacent the casing —6— and keyed to the said shaft is the eccentric drum —12—, having its periphery formed in three eccentrics —13—, —14— and —15—. The eccentric drum —12— is annularly bored on the side non-adjacent the casing —6— and receives therein the male clutch member —16—, slidably mounted on the shaft —11—. This clutch member —16— carries fingers or teeth —17— which project through bores in the eccentric drum —22— and engage similar bores —17'— in the side of the casing —6— and which lie at the bottom of the annular groove —18— in the said casing, thereby the casing —6— is utilized as a female clutch member. The male clutch member —16— is normally adapted to be held out of engagement by means of the spring —19— interposed between the male clutch member —16— and the eccentric drum —12— and carried by the shaft —3—. The clutch member —16— carries a groove external of its journal member and in which the bifurcated end —21— of the lever —22— fits. The lever —22— is suitably fulcrumed at —23— between its ends and the other end is connected to the lever —24— so that when the lever —24— is reciprocated it throws the clutch member —16— into or out of driving engagement as the case may be.

Mounted in the casing —1— are the three cylinders —25—, —26— and —27—, containing therein the working pistons —25'—, —26'— and —27'—. The rods —25''—, —26''— and —27''— of these pistons are connected to the rods —13''—, —14''— and —15''— of the eccentric straps —14'—, —15'— and —16'— mounted on the eccentrics —13—, —14— and —15— of the drum —12—, so that when the drum —12— is revolved the pistons are reciprocated within their respective cylinders. Each of the said cylinders have therein two ports —28— and —28'—, one at each end of the cylinder and located beyond the travel of the piston. The openings of these ports are controlled by sliding valves —29— and —29'—, all of which are simultaneously actuated by means of the lever —30—, having the bifurcated end —31—, the two arms of which are connected to the various valves and guided by the members —32— carried by the cylinders. The cylinders are suitably closed at both ends.

A suitable arrangement for simultaneously actuating the valves and the male clutch member is illustrated in Figs. 1 and 7 of the drawings and consists in the bell crank lever —33— pivoted at —34—, one end of which is connected to the lever —30— by means of the link —35—, the other end being operatively connected to the actuating lever —36—. One end of the bell crank lever is adapted to engage the shoe —37— carried by the lever —24—, actuating the clutch, so that when the clutch is operated the valve closures will also be operated. The valve closures are so arranged on a bifurcated member —31— that they will not begin to close the ports until the clutch is fully engaged.

When the drive shaft —2— is revolving and it is desired to have the driven shaft —3— remain idle the levers are operated so that the clutch and valve are brought into the position shown in Fig. 2; that is, the valves in the cylinders are wide open and the clutch —15— is disengaged, therefore the casing —6— will rotate freely about the shafts —2— and —3— without imparting any motion whatever to the shaft —3— by reason of the fact that practically no resistance is offered to the planetary movement of the gears —10— and —11— about the shafts —2— and —3— as an axis. However if it is wished to impart motion to the shaft —3— the clutch —16— is thrown into engagement with the casing —6— and the eccentrics are thereby caused to operate the pistons. And now if the casing be filled partially with oil or other fluid so that it submerges both ends of each cylinder and is thereby caused to enter the valves; the resistance of the oil to expulsion from the cylinders by the piston serves to retard the speed of the eccentric drum —12— and casing —6— carrying the gears —10— and —11—, and thereby the planetary movement is diminished, and the loss in planetary movement will be transmitted through the gears —4— and —11— and —5— and —10— to the shaft —3—. The speed of the shaft —3— may accordingly be varied regardless of the speed of the shaft —2— by varying the resistance of the oil to expulsion from the cylinders by the pistons. And this resistance is varied by changing the valve openings. Therefore as the valves of the said cylinders close the resistance increases due to the decrease in the size of the openings, and when the valves are entirely closed the members —6— and —12— will be stationary and the drive will be direct through the gears —4—, —11— and —5— and —10— to the shaft —3— without any planetary movement whatever. Accordingly it will be seen that the speed of the driven shaft varies directly as the resistance.

In automobile construction I may find it convenient to provide, in the drive shaft between the engine and the transmission, a clutch of any of the usual types now in use.

It is understood that many modifications may be made in my invention without in any way departing from the spirit of the same.

What I claim is:

1. A fluid controlled variable speed transmission gear, comprising in combination, a casing adapted to contain fluid therein, a driving shaft entering the said casing and having a gear disposed at the end thereof, a driven shaft entering said casing and having a gear disposed at the end thereof, and said shafts being in alinement, an annular casing mounted on the said shaft and adapted to rotate thereon, a shaft rotatably mounted in the said annular casing and carrying thereon two gears, one meshing with the said gear on the driving shaft and the other with the said gear on the driven shaft, said annular casing being adapted to form a female clutch member, an eccentric drum rotatably disposed on the said driven shaft and having one or more eccentric surfaces on the periphery thereof, a male clutch member disposed on the said driven shaft and adapted to form a driving connection between said eccentric drum and said annular casing, one or more cylinders disposed in said casing and having ports therein, a piston disposed in each of the said cylinders, means for driving said pistons from said eccentric surfaces, and means for varying the openings of the said ports in the said cylinders.

2. A fluid controlled variable speed transmission gear, comprising in combination, a casing adapted to contain fluid therein, a driving shaft entering said casing and having a gear disposed thereon, a driven shaft entering said casing and having a gear disposed thereon, said shafts being in alinement, an annular casing rotatably mounted on the said shafts and having disposed therein two gears adapted to move planetarily about said first mentioned gears, one of said gears meshing with the said gear on the driving shaft and the other with the said gear on the driven shaft, said annular casing being adapted to form a female clutch member, an eccentric drum rotatably disposed on the said driven shaft and having one or more eccentric surfaces on the periphery thereof, and having an annular bore therein, a male clutch member slidably disposed on the said driven shaft and fitting in the said annular bore of the eccentric drum, and adapted to engage said eccentric drum and annular casing and form a rigid driving connection therebetween, one or more cylinders disposed in said casing and having ports therein, a piston disposed in each of the said cylinders, means for driving said piston from said eccentric surfaces, means for varying the opening of the said ports in the cylinder, and means for simultaneously operating the said male clutch member and means for varying the port openings.

3. A fluid controlled variable speed transmission gear, comprising in combination, a casing adapted to contain fluid therein, a driving shaft entering said casing and having a gear disposed at the end thereof, a driven shaft entering said casing and having a gear disposed at the end thereof, and said shafts being in alinement, an annular casing mounted on the said shaft and adapted to rotate thereon, a shaft rotatably mounted in the said annular casing and carrying thereon two gears one gear meshing with the said gear on the driving shaft and the other with the said gear on the driven shaft, said gears being adapted to move planetarily about the axis of said driving and driven shafts, an eccentric drum rotatably disposed on the said driven shaft and having one or more eccentric surfaces on the periphery thereof, said drum and annular casing being bored to receive therein the fingers of a male clutch member, a male clutch member, having fingers, disposed on said driven shaft and adapted to form a driving connection between said eccentric drum and said annular casing, one or more cylinders disposed in said casing and having ports therein, a piston disposed in each of the said cylinders, means for driving said piston from said eccentric surfaces, slide valves for closing said cylinder ports, and means for simultaneously operating said clutch member and slide valves.

In testimony whereof I affix my signature in presence of two witnesses.

WALTER EARLE SCHEIBNER.

Witnesses:
G. THOMPSON,
J. McPHERSON.